US009039064B1

(12) United States Patent  
Baude

(10) Patent No.: US 9,039,064 B1  
(45) Date of Patent: May 26, 2015

(54) WINDSHIELD SUN SCREEN

(71) Applicant: Jayne B. Baude, Boynton Beach, FL (US)

(72) Inventor: Jayne B. Baude, Boynton Beach, FL (US)

(*) Notice: Subject to any disclaimer, the term of this patent is extended or adjusted under 35 U.S.C. 154(b) by 0 days.

(21) Appl. No.: 14/508,509

(22) Filed: Oct. 7, 2014

Related U.S. Application Data

(60) Provisional application No. 61/952,361, filed on Mar. 13, 2014.

(51) Int. Cl.
*B60J 1/20* (2006.01)
*B62D 25/04* (2006.01)
*E06B 9/264* (2006.01)

(52) U.S. Cl.
CPC .............. *B60J 1/2077* (2013.01); *B62D 25/04* (2013.01); *E06B 9/264* (2013.01); *B60J 1/203* (2013.01); *E06B 2009/2646* (2013.01)

(58) Field of Classification Search
CPC . B62D 25/04; E06B 9/264; E06B 2009/2646; B60J 1/203; B60J 1/2063
USPC ........................................ 160/370.22; 156/99
See application file for complete search history.

(56) References Cited

U.S. PATENT DOCUMENTS

| | | | |
|---|---|---|---|
| 2,304,691 A | 12/1942 | Hund | |
| 2,552,955 A | 5/1951 | Gaiser et al. | |
| 4,335,166 A | 6/1982 | Lizardo et al. | |
| 4,721,636 A | 1/1988 | Hood et al. | |
| 4,823,859 A | 4/1989 | Park | |
| 4,932,608 A | 6/1990 | Heidish et al. | |
| 5,615,924 A | 4/1997 | Owen | |
| 5,782,284 A | 7/1998 | Leatherman | |
| 5,987,216 A | 11/1999 | Krug | |
| 6,227,601 B1 | 5/2001 | LaFrance | |
| 6,279,984 B1 | 8/2001 | Reina, Jr. | |
| 6,546,990 B2 | 4/2003 | Peeters | |
| 6,668,902 B2* | 12/2003 | Bong | 160/370.22 |
| 6,848,493 B1 | 2/2005 | Hansen et al. | |
| 6,857,693 B2 | 2/2005 | Hattass et al. | |
| 6,979,042 B2 | 12/2005 | Kawasaki | |
| 7,216,917 B2 | 5/2007 | Tadakamalla | |
| 7,461,887 B1 | 12/2008 | Federle et al. | |
| 7,942,463 B2* | 5/2011 | Starzmann et al. | 296/143 |
| 8,061,757 B1* | 11/2011 | Moore et al. | 296/97.4 |
| 8,251,433 B2 | 8/2012 | Boer | |
| 8,308,217 B2* | 11/2012 | Patel et al. | 296/97.1 |
| 2007/0158970 A1* | 7/2007 | Kim | 296/97.4 |

* cited by examiner

*Primary Examiner* — Pinel Romain
(74) *Attorney, Agent, or Firm* — Robert C. Montgomery; Montgomery Patent & Design, LP

(57) ABSTRACT

A sun screen is taught that includes a left pillar assembly having a left pillar and a left screen panel and a right pillar assembly having a right pillar and a right screen panel. An outer windshield spans between the left pillar assembly and the right pillar assembly and an inner windshield spans between the left pillar assembly and the right pillar assembly and away from the outer windshield to form a gap. A left handle having a left magnet connects to the left screen panel and a right handle having a right magnet connects to the right screen panel. The right handle selectively deploys the right screen panel towards the center of the inner windshield and the left handle selectively deploy the left screen panel towards the center. When fully deployed the right magnet and the left magnet hold the right handle and the left handle together.

18 Claims, 3 Drawing Sheets

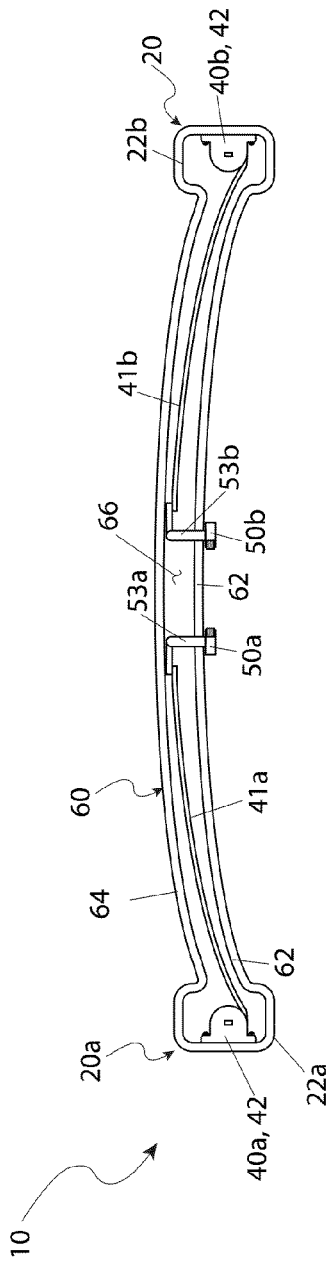
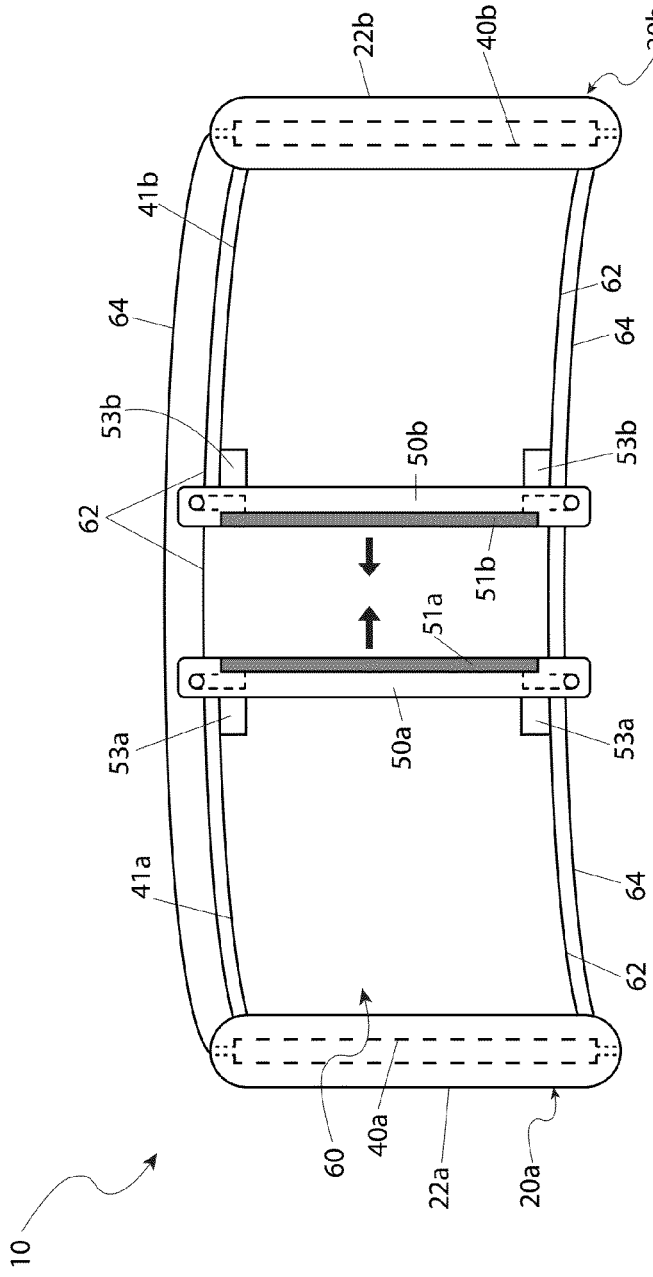

WINDSHIELD SUN SCREEN

RELATED APPLICATIONS

This application claims the benefit of U.S. Provisional Application No. 61/952,361, which was filed Mar. 13, 2014, the entire disclosures of which are incorporated herein by reference.

FIELD OF THE INVENTION

The present invention relates to vehicle sun screens. More particularly, the present invention relates to vehicle sunscreens that can be drawn from both sides of a windshield to a center position to cover the windshield.

BACKGROUND OF THE INVENTION

Anyone who has ever gotten into a closed car that has been parked in the hot sun all day can tell you how hot and intolerable the experience is. The heat can be so stifling that it takes your breath away just standing outside of the vehicle. Time is often wasted while waiting for the vehicle to cool off prior to getting in the vehicle. Once inside, even if the driver is lucky enough to have air conditioning it can take several minutes before the car is cool enough to be tolerable.

Besides causing the discomfort of the occupants the car interior and contents of the car can also suffer from the heat. Ultraviolet radiation and heat over time can destroy plastic, fabrics, and the like.

A popular tool for combating heat buildup in vehicles is a cardboard shield which is unfolded and secured behind the rear-view mirror. These cardboard shields suffer from several problems. First, they are unsightly. Second, they only provide protection for the windshield and do not mitigate sunlight through any of the other windows. Finally, these cardboard shields are large and cumbersome and therefore difficult to put up and take down. This results in infrequent use, wasted time prior to exiting and entering vehicles, and improper installation, all of which limit the effectiveness of such devices.

Having recognized the abovementioned problems, the inventor has observed there remains a need for a vehicle sunscreen by which the interior of a motor vehicle can be protected from the effects of sun and heat buildup without the inefficiencies associated with conventional automotive window shields.

SUMMARY OF THE INVENTION

The principles of the present invention provide for a vehicle sunscreen by which the interior of a motor vehicle can be protected from the effects of sun and heat buildup without the inefficiencies associated with conventional automotive window shields.

A sun screen that is in accord with the present invention includes a left pillar assembly having a left pillar and a left screen panel and a right pillar assembly having a right pillar and a right screen panel. An outer windshield is disposed between the left pillar assembly and the right pillar assembly and an inner windshield is disposed between the left pillar assembly and the right pillar assembly and disposed away from the outer windshield to form a gap therebetween. A left handle having a left magnet is connected to the left screen panel and a right handle having a right magnet is connected to the right screen panel. The right handle selectively deploys the right screen panel towards the center of the inner windshield and the left handle selectively deploys the left screen panel towards the center of the inner windshield. When fully deployed the right magnet and the left magnet can hold the right handle and the left handle together.

In practice the left pillar assembly includes a left recoil device holding the left screen panel and/or the left handle pulls the left screen handle from the recoil device from above and from below the inner windshield and through the gap. In practice a left handle bracket connects the left handle to the left screen panel and the left screen panel includes a coating. A seal can be disposed between the outer windshield and the left pillar assembly while the left recoil device includes a torsion spring. The left recoil device may be fastened to the left pillar.

A vehicle in accord with the present invention includes a left pillar assembly having a left pillar attached to the vehicle and a left screen panel and a right pillar assembly having a right pillar attached to the vehicle and a right screen panel. An outer windshield is disposed between the left pillar assembly and the right pillar assembly and an inner windshield is disposed between the left pillar assembly and the right pillar assembly and disposed away from the outer windshield to form a gap therebetween. A left handle having a left magnet is connected to the left screen panel and a right handle having a right magnet is connected to the right screen panel. The right handle can selectively deploys the right screen panel towards the center of the inner windshield and the left handle can selectively deploy the left screen panel towards the center of the inner windshield. When fully deployed the right magnet and the left magnet can hold the right handle and the left handle together.

In practice the left pillar assembly includes a left recoil device holding the left screen panel and/or the left handle pulls the left screen handle from the recoil device from above and from below the inner windshield and through the gap. In practice a left handle bracket connects the left handle to the left screen panel and the left screen panel includes a coating. A seal can be disposed between the outer windshield and the left pillar assembly while the left recoil device includes a torsion spring. The left recoil device may be fastened to the left pillar.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

FIG. 2a is a top section view of the windshield sun screen 10 shown in FIG. 1;

FIG. 2b is a front view of the windshield sun screen 10 shown in FIG. 1; and,

Figure 1:
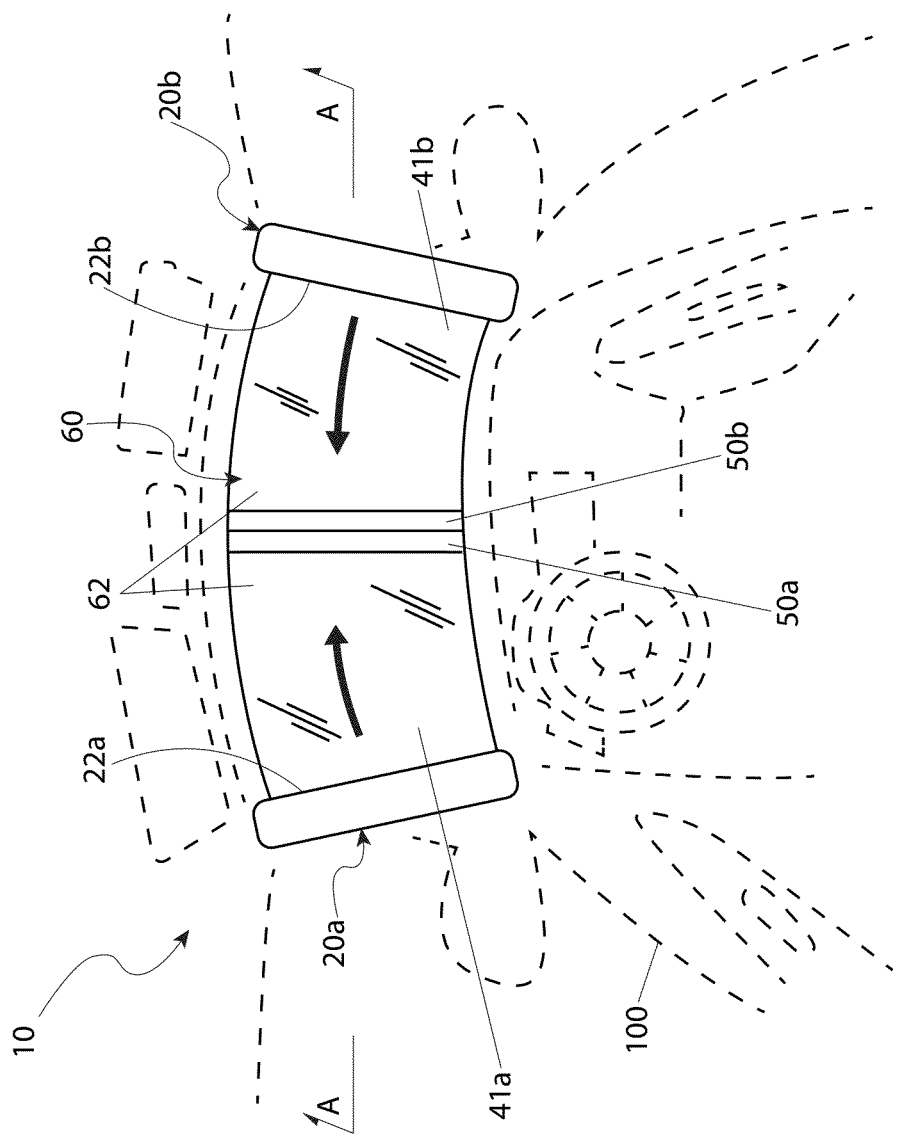
FIG. 1 is an environmental view of a windshield sun screen 10 according to a preferred embodiment of the present invention.

DESCRIPTIVE KEY 10 windshield sun screen
20a left pillar assembly
20b right pillar assembly
22a left pillar
22b right pillar
24a outer windshield seal 24b inner windshield seal
40a left recoil device
40b right recoil device
41a left screen panel
41b right screen panel
42 recoil mounting bracket
46 recoil axle
48 torsion spring
50a left handle
50b right handle
51a left magnet
51b right magnet
53a left handle bracket
53b right handle bracket
60 windshield assembly
62 inner windshield
64 outer windshield
66 gap
80 fastener
100 vehicle/passenger compartment

DETAILED DESCRIPTION OF THE PREFERRED EMBODIMENT

Figure 3:
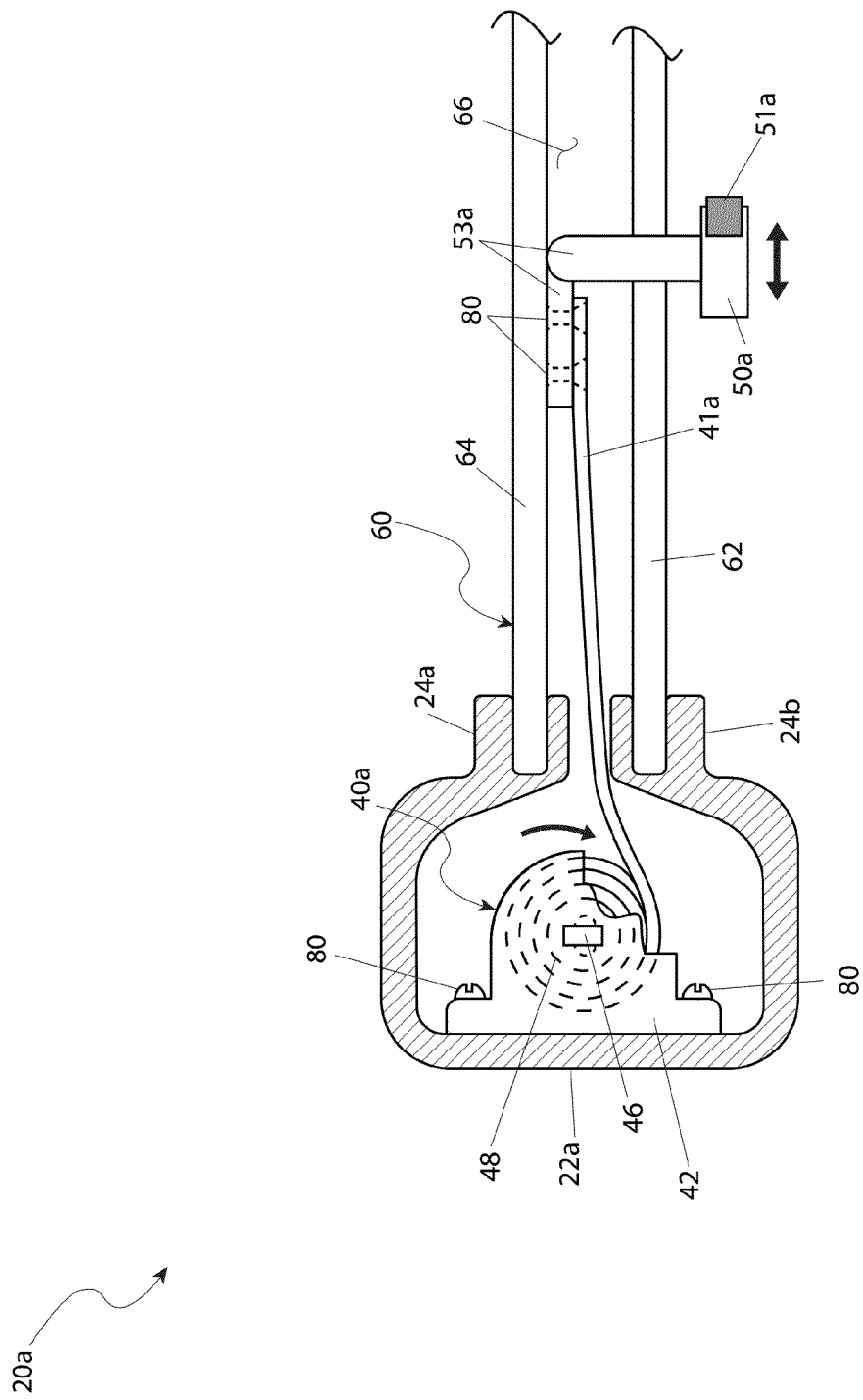
FIG. 3 is a close-up sectional view taken along section line A-A of FIG. 1.

The preferred embodiment of the present invention is depicted within FIGS. 1 through 3. However, the invention is not limited to what is specifically illustrated and described. A person skilled in the art will appreciate that many other embodiments of the invention are possible without deviating from the basic concept of the invention. Any such work around also falls with the scope of this invention.

The terms "a" and "an" herein do not denote a limitation of quantity, but rather denote the presence of at least one (1) of the referenced items. In addition, unless otherwise denoted all directional signals such as up, down, left, right, inside, outside are taken relative to the illustration shown in FIG. 1.

FIG. 1 presents an environmental view of a windshield sun screen 10 (hereinafter "sun screen 10"). The sun screen 10 provides interior vehicle shading of sunlight entering a vehicle 100. The sun screen 10 has a double-paned windshield assembly 60 having a gap 66 (see FIG. 2) formed between an interior windshield pane 62 and an exterior windshield pane 64 (again, reference FIG. 2). The interior windshield pane 62 and the exterior windshield pane 64 act as guides for an internally extendable right screen panel 41b and an internally extendable left screen panel 41a.

Referring now primarily to FIGS. 2a, 2b and 3, the left screen panel 41a rolls up into and pulls out from a left recoil device 40a while the right screen panel 41b rolls up into and pulls out from a right recoil device 40b. The left and right recoil devices 40a and 40b are discreetly contained within a respective left pillar assembly 20a and within a right pillar assembly 20b of the vehicle 100.

The screen panels 41a, 41b are manually deployed by grasping and moving a respective left handle 50a and a right handle 50b horizontally from their "rest" positions against the pillar assemblies 20a, 20b toward the center of the windshield assembly 60. When the handles 50a, 50b contact each other respective left magnet 51a and right magnet 51b which are recessed within the handles 50a, 50b fasten to each other, thereby retaining the handles 50a, 50b and screen panels 41a, 41b in the closed, sun-blocking position has shown in FIG. 1.

The screen panels 41a, 41b are envisioned as being made using a rugged flexible textile sheet material that is capable of withstanding repetitive rolling and unrolling. The left and right screen panels 41a, 41b beneficially have reflective and/or UV protective coatings on their outer and/or inner surfaces. The protective coating(s) help protect the interior of the vehicle 100 from damage resulting from prolonged exposure to sunlight and resultant high temperatures.

Still referring to FIGS. 2a, 2b, and 3, the left pillar assembly 20a and the right pillar assembly 20b are hollow structures retaining their respective left recoil device 40a and right recoil device 40b. The left and right recoil devices 40a, 40b provide constant winding tensions to their respective left screen panel 41a and right screen panel 41b. Those screen panels 41a, 41b are affixed to their respective left handle 50a and right handle 50b via a respective left handle bracket 53a and a right handle bracket 53b. The left and right handles 50a, 50b are vertical grasping structures preferably made of a strong lightweight material such as plastic, aluminum, or the like. The left and right handles 50a, 50b are envisioned as having rectangular or circular cross-sectional shapes and are affixed using respective left and right handle brackets 53a, 53b located at the top and bottom leading edges of their respective screen panels 41a, 41b.

The outer windshield 64 is envisioned as having the same or similar construction and as a normal single-paned vehicle windshield. As such it is abutted and sealed in a conventional manner along cowl, roof, and pillar locations. However, the inner windshield 62 has an open top and bottom edges that are slightly recessed from the headliner and dashboard of the vehicle 100. Again, a gap 60 exists between the outer windshield 64 and the inner windshield 62. The recessed edges of the inner windshield 62 running along the gap 66 enable access to the screen panels 41a, 41b and attachment of the left and right handle brackets 53a, 53b to the left and right screen panels 41a, 41b.

Referring now primarily to FIG. 3, the pillar assemblies 20a, 20b are envisioned as providing the normal structural functionality of pillars as well as sealing the windshields 62, 64. While only the left pillar assembly 20a and left recoil device 40a are shown in FIG. 3 that is for simplicity of illustration. Since the opposing right pillar assembly 20b and its right recoil device 40b are mirror-images of the left pillar assembly 20a and left recoil device 40a depiction of only one of the pillar assemblies is required for a complete understanding of both. The windshields 62, 64 are sealed to the pillar assembly 20a using a respective outer windshield seal 24a and an inner windshield seal 24b. While those seals are depicted as and beneficially are channel-shaped structures the sun screen 10 may utilize other structures and sealing methods.

The left pillar assembly 20a provides a mount for the inner windshield 62 and outer windshield 64 as well as housing the left recoil device 40a. The left recoil device 40a is a cylindrical, spring-loaded mechanism that is vertically positioned within the left pillar assembly 20a. The left recoil device 40a is fastened along an inner surface of the left pillar assembly 20a using a pair of recoil mounting brackets 42 at top and bottom locations. Threaded fasteners 80 such as screws, rivets, and the like hold the left recoil device 40a in place.

The left recoil device 40a includes a torsion spring 48 that encompasses a recoil axle 46. This enables the upper and lower ends of the left screen panel 41a to attach to and to be acted upon by the recoil axle 46, thereby applying a tensioning force to the left screen panel 41a in a manner similar as that of a common window shade.

The preferred embodiment of the present invention is envisioned as being original equipment in various makes and models of motor vehicles 100. As such it can be used by the common user in a simple and effortless manner with little or no training. After initial purchase or acquisition of a motor vehicle 100 having a sun screen 10 it would be used as indicated in FIGS. 1, 2a, and 2b.

The method of using the sun screen 10 includes deploying both the left screen panel 41a and the right screen panel 41b by grasping respective handles 50a, 50b; moving the handles 50a, 50b toward the center of the windshield assembly 60 until the left magnet 51a and right magnet 51b of the left and right handles 50a, 50b attach to each other; releasing the handles 50a, 50b; and using the sun screen 10 to protect the interior of the motor vehicles 100.

The method of retracting the sun screen 10 is accomplished by: grasping the handles 50a, 50b; separating the handles 50a, 50b gently; and manually guiding the handles 50a, 50b and their affixed screen panels 41a, 41b apart until the screen panels 41a, 41b are recoiled into the pillar assemblies 20a, 20b and the handles 50a, 50b are against the pillar assemblies 20a, 20b.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A sun screen, comprising:
   a left pillar assembly having a left pillar and a left screen panel;
   a right pillar assembly having a right pillar and a right screen panel;
   an outer windshield disposed between said left pillar assembly and said right pillar assembly;
   an inner windshield disposed between said left pillar assembly and said right pillar assembly and disposed from away from said outer windshield to form a gap therebetween;
   a left handle connected to said left screen panel, said left handle having a left magnet;
   a right handle connected to said right screen panel, said right handle having a right magnet;
   wherein said right handle selectively deploys said right screen panel towards the center of said inner windshield;
   wherein said left handle selectively deploys said left screen panel towards the center of said inner windshield; and,
   wherein said right magnet and said left magnet can hold said right handle and said left handle together.

2. The sun screen of claim 1, wherein said left pillar assembly includes a left recoil device holding said left screen panel.

3. The sun screen of claim 1, wherein said left handle pulls said left screen handle from said recoil device from above and from below said inner windshield.

4. The sun screen of claim 3, wherein said left handle pulls said left screen handle through said gap.

5. The sun screen of claim 4, further including a left handle bracket connecting said left handle to said left screen panel.

6. The sun screen of claim 3, wherein said left screen panel includes a coating on a surface.

7. The sun screen of claim 2, further including a seal disposed between said outer windshield and said left pillar assembly.

8. The sun screen of claim 7, wherein said left recoil device includes a torsion spring.

9. The sun screen of claim 8, wherein said left recoil device is fastened to said left pillar.

10. A vehicle, comprising:
    a left pillar assembly having a left pillar attached to the vehicle and a left screen panel;
    a right pillar assembly having a right pillar attached to the vehicle and a right screen panel;
    an outer windshield disposed between said left pillar assembly and said right pillar assembly;
    an inner windshield disposed between said left pillar assembly and said right pillar assembly and disposed from said outer windshield to form a gap therebetween;
    a left handle connected to said left screen panel, said left handle having a left magnet; and,
    a right handle connected to said right screen panel, said right handle having a right magnet;
    wherein said right handle selectively deploys said right screen panel towards the center of said inner windshield;
    wherein said left handle selectively deploys said left screen panel towards the center of said inner windshield; and,
    wherein said right magnet and said left magnet can hold said right handle and said left handle together.

11. The vehicle of claim 10, wherein said left pillar assembly includes a left recoil device holding said left screen panel.

12. The vehicle of claim 10, wherein said left handle pulls said left screen handle from said recoil device from above and from below said inner windshield.

13. The vehicle of claim 12, wherein said left handle pulls said left screen handle through said gap.

14. The vehicle of claim 13, further including a left handle bracket connecting said left handle to said left screen panel.

15. The vehicle of claim 12, wherein said left screen panel includes a coating on a surface.

16. The vehicle of claim 11, further including a seal disposed between said outer windshield and said left pillar assembly.

17. The vehicle of claim 16, wherein said left recoil device includes a torsion spring.

18. The vehicle of claim 17, wherein said left recoil device is fastened to said left pillar.

* * * * *